(12) United States Patent
Nakajima et al.

(10) Patent No.: US 10,301,693 B2
(45) Date of Patent: May 28, 2019

(54) HIGH-STRENGTH HOT-ROLLED STEEL SHEET AND METHOD FOR PRODUCING THE SAME

(71) Applicant: JFE Steel Corporation, Tokyo (JP)

(72) Inventors: Katsumi Nakajima, Tokyo (JP); Kazuhiko Yamazaki, Tokyo (JP); Chikara Kami, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 15/143,965

(22) Filed: May 2, 2016

(65) Prior Publication Data

US 2016/0258032 A1    Sep. 8, 2016

Related U.S. Application Data

(62) Division of application No. 14/784,450, filed as application No. PCT/JP2014/001508 on Mar. 17, 2014.

(30) Foreign Application Priority Data

Apr. 15, 2013  (JP) .................................. 2013-084446
Apr. 15, 2013  (JP) .................................. 2013-084447

(51) Int. Cl.
*C21D 1/20*    (2006.01)
*C21D 6/00*    (2006.01)
(Continued)

(52) U.S. Cl.
CPC ............. *C21D 1/20* (2013.01); *B21D 22/022* (2013.01); *B32B 15/013* (2013.01); *C21D 1/84* (2013.01); *C21D 6/005* (2013.01); *C21D 6/008* (2013.01); *C21D 8/0205* (2013.01); *C21D 8/0226* (2013.01); *C21D 8/0263* (2013.01); *C21D 8/0426* (2013.01); *C21D 8/0463* (2013.01); *C21D 9/46* (2013.01); *C22C 18/04* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C23C 2/02* (2013.01); *C23C 2/06* (2013.01); *C23C 2/28* (2013.01); *C23C 2/40* (2013.01); *C23F 17/00* (2013.01); *C21D 6/004* (2013.01); *C21D 2211/002* (2013.01); *C21D 2211/003* (2013.01); *C22C 38/16* (2013.01); *C22C 38/18* (2013.01); *C22C 38/24* (2013.01); *C22C 38/28* (2013.01); *C22C 38/32* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01)

(58) Field of Classification Search
CPC ...... B21D 22/022; B32B 15/013; C21D 1/20; C21D 1/84; C21D 2211/002; C21D 2211/003; C21D 6/004; C21D 6/005; C21D 6/008; C21D 6/0205; C21D 6/0226; C21D 6/0263; C21D 6/0426; C21D 6/0463; C21D 9/46; C22C 18/04; C22C 38/00; C22C 38/001; C22C 38/002; C22C 38/005; C22C 38/008; C22C 38/02; C22C 38/04; C22C 38/06; C22C 38/08; C22C 38/12; C22C 38/14; C22C 38/16; C22C 38/18; C22C 38/24; C22C 38/28; C22C 38/32; C22C 38/38; C22C 38/42; C22C 38/44; C22C 38/46; C22C 38/48; C22C 38/50; C22C 38/54; C22C 38/58; C23C 2/02; C23C 2/06; C23C 2/28; C23C 2/40; C23F 17/00
See application file for complete search history.

(56) References Cited

U.S. PATENT DOCUMENTS 6,818,079 B2   11/2004   Inoue et al.
8,876,987 B2   11/2014   Matsuda
(Continued)

FOREIGN PATENT DOCUMENTS

CN   101646794   2/2010
CN   102341521   2/2012
(Continued)

OTHER PUBLICATIONS

Korean Office Action with partial English language translation for Application No. 10-2015-7031659, dated Sep. 28, 2016, 10 pages.
(Continued)

*Primary Examiner* — Colleen P Dunn
*Assistant Examiner* — Anthony M Liang
(74) *Attorney, Agent, or Firm* — RatnerPrestia

(57) ABSTRACT

A steel slab having a composition containing C: more than 0.07% and 0.2% or less, Si: 2.0% or less, Mn: 1.0% to 3.0%, Al: 0.1% or less, Ti: 0.05% to 0.3%, and V: 0.05% to 0.3% on a mass percent basis is heated to 1100° C. or more and is subjected to rough rolling and finish rolling. In the finish rolling, the total rolling reduction of two final passes is 30% or more, and the finish rolling temperature ranges from ($A_{r3}$ transformation temperature) to ($A_{r3}$ transformation temperature+120° C.). Cooling is started within 2 seconds after the finish rolling. Coiling is performed at an average cooling rate of 40° C./s or more at a coiling temperature in the range of 300° C. to 500° C. The resulting high-strength hot-rolled steel sheet has a microstructure in which a bainite phase constitutes more than 90% by volume, the average lath interval of bainite is 0.45 μm or less, and the ratio of Fe-based carbide precipitated in bainite lath to all Fe-based carbide is 10% or more, has a high tensile strength of 900 MPa or more, and has significantly improved punchability in mass production.

17 Claims, No Drawings

(51) Int. Cl.

| | | |
|---|---|---|
| *C21D 9/46* | (2006.01) | |
| *C22C 18/04* | (2006.01) | |
| *C22C 38/00* | (2006.01) | |
| *C22C 38/14* | (2006.01) | |
| *B32B 15/01* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C21D 8/02* | (2006.01) | |
| *C21D 8/04* | (2006.01) | |
| *C23C 2/02* | (2006.01) | |
| *C23C 2/40* | (2006.01) | |
| *B21D 22/02* | (2006.01) | |
| *C21D 1/84* | (2006.01) | |
| *C23C 2/06* | (2006.01) | |
| *C23C 2/28* | (2006.01) | |
| *C23F 17/00* | (2006.01) | |
| *C22C 38/16* | (2006.01) | |
| *C22C 38/18* | (2006.01) | |
| *C22C 38/24* | (2006.01) | |
| *C22C 38/28* | (2006.01) | |
| *C22C 38/32* | (2006.01) | |
| *C22C 38/38* | (2006.01) | |
| *C22C 38/44* | (2006.01) | |
| *C22C 38/46* | (2006.01) | |
| *C22C 38/50* | (2006.01) | |
| *C22C 38/58* | (2006.01) | |
| *C22C 38/42* | (2006.01) | |
| *C22C 38/48* | (2006.01) | |
| *C22C 38/54* | (2006.01) | |

(56) References Cited

U.S. PATENT DOCUMENTS

| | | |
|---|---|---|
| 2002/0007882 A1 | 1/2002 | Inoue et al. |
| 2003/0205302 A1 | 11/2003 | Inoue et al. |
| 2005/0000606 A1 | 1/2005 | Inoue et al. |
| 2010/0074794 A1 | 3/2010 | Ahn |
| 2013/0160904 A1 | 6/2013 | Saito |
| 2013/0167985 A1 | 7/2013 | Saito |
| 2013/0276940 A1 | 10/2013 | Nakajima |
| 2014/0007993 A1 | 1/2014 | Nakajima |
| 2014/0230970 A1 | 8/2014 | Perlade et al. |
| 2016/0068937 A1 | 3/2016 | Nakajima et al. |

FOREIGN PATENT DOCUMENTS

| | | |
|---|---|---|
| EP | 2130938 | 12/2009 |
| EP | 2436797 | 4/2012 |
| EP | 2599887 | 6/2013 |
| EP | 2617850 | 7/2013 |
| EP | 2617851 | 7/2013 |
| JP | 06264183 | 9/1994 |
| JP | 2003160836 | 6/2003 |
| JP | 2004315857 | 11/2004 |
| JP | 2005298924 | 10/2005 |
| JP | 2005298956 A | 10/2005 |
| JP | 2005298964 | 10/2005 |
| JP | 2006161139 | 6/2006 |
| JP | 3889766 | 3/2007 |
| JP | 2008069425 | 3/2008 |
| JP | 2009263715 | 11/2009 |
| JP | 2012062557 | 3/2012 |
| JP | 2012062558 | 3/2012 |
| JP | 2012062561 | 3/2012 |
| JP | 2012062562 | 3/2012 |
| JP | 2012251201 | 12/2012 |
| JP | 2012255176 | 12/2012 |
| KR | 20130021460 | 3/2013 |
| WO | 9905328 | 2/1999 |
| WO | 2012036307 | 3/2012 |
| WO | 2012036308 | 3/2012 |
| WO | 2012127125 A1 | 9/2012 |
| WO | 2013051238 | 4/2013 |

OTHER PUBLICATIONS

Chinese Office Action with English translation and English Search Report for Application No. 201480020728.9, dated Jun. 29, 2016, 31 pages.
International Search Report for International Application No. PCT/JP2014/001508, dated Jun. 17, 2014, 2 pages. 2014.
Supplementary European Search Report for European Application No. 14784648, dated Apr. 14, 2016, 4 pages. 2016.
European Office Action for Application No. 14/784 648.9, dated Apr. 12, 2017, 7 pages.
Non-Final Office Action for U.S. Appl. No. 14/778,339, dated Jul. 28, 2017, 13 pages.
Final Office Action for U.S. Appl. No. 14/778,339, dated Nov. 14, 2017, 23 pages.
Final Office Acton for U.S. Appl. No. 14/370,330, dated Oct. 11, 2017, 9 pages.
Non Final Office Action for U.S. Appl. No. 14/784,450, dated Oct. 17, 2017, 31 pages.
Extended European Search Report for European Application No. 18 158 632.2, dated Apr. 25, 2018, 8 pages.
Final Office Action for U.S. Appl. No. 14/784,450, dated Apr. 24, 2018, 23 pages.
Final Office Action for U.S. Appl. No. 14/778,339, dated Apr. 27, 2018, 23 pages.
Non-Final Office Action for U.S. Appl. No. 14/784,455, dated Jan. 8, 2018, 72 pages.
Final Office Action for U.S. Appl. No. 14/784,455, dated Jul. 13, 2018, 25 pages.
Non Final Office Action for U.S. Appl. No. 14/778,339, dated Jan. 30, 2019, 20 pages.

HIGH-STRENGTH HOT-ROLLED STEEL SHEET AND METHOD FOR PRODUCING THE SAME

CROSS REFERENCE TO RELATED APPLICATIONS

This application is a division of U.S. patent application Ser. No. 14/784,450, filed Oct. 14, 2015, which is the U.S. National Phase application of PCT/JP2014/001508, filed Mar. 17, 2014, which claims priority to Japanese Patent Application No. 2013-084446, filed Apr. 15, 2013, and Japanese Patent Application No. 2013-084447, filed Apr. 15, 2013, the disclosures of each of these applications being incorporated herein by reference in their entireties for all purposes.

FIELD OF THE INVENTION

The present invention relates to a high-strength hot-rolled steel sheet suitable for, for example, structural parts, such as members and frames, and underbody parts, such as suspensions, of automobile bodies, as well as automotive body components, such as truck frame parts. In particular, the present invention relates to improvement of punchability during mass production (hereinafter also referred to as punchability in mass production).

BACKGROUND OF THE INVENTION

In recent years, from a global environmental conservation standpoint, there has been a strong demand for improved vehicle fuel efficiency. Thus, high-strength steel sheets are actively utilized as automotive body components in order to reduce the weight of automobile bodies. High-strength steel sheets are utilized not only in automobile structural parts but also in underbody parts and truck frame parts. In general, higher-strength steel sheets have lower workability. In particular, because automotive parts are formed by intense processing, steel sheets used as automotive body component materials are strongly required to have high strength and good workability.

To address such demands, for example, Patent Literature 1 describes a high-strength hot-rolled steel sheet having a composition containing, on a mass percent basis, C: 0.05% to 0.15%, Si: 1.50% or less, Mn: 0.5% to 2.5%, P: 0.035% or less, S: 0.01% or less, Al: 0.020% to 0.15%, and Ti: 0.05% to 0.2%, wherein the high-strength hot-rolled steel sheet has a microstructure containing 60% to 95% by volume bainite and solute-strengthened or precipitation-strengthened ferrite or ferrite and martensite and has good hole expansion formability, which is shown by a fracture transition temperature of 0° C. or less in a Charpy impact test. In a technique described in Patent Literature 1, after hot rolling, a steel sheet is cooled to a temperature in the range of 400° C. to 550° C. at an average cooling rate of 30° C./s or more, is coiled, and is cooled to a temperature of 300° C. or less at a cooling rate in the range of 50° C./h to 400° C./h. Patent Literature 1 states that such a process can prevent diffusion of P in grain boundaries, decrease the fracture transition temperature to 0° C. or less, improve toughness, and improve hole expansion formability.

Among automotive body components, truck frame parts and underbody parts are particularly frequently bored in order to join parts or reduce their weight or in order for a subsequent burring process or bore expanding process. In general, such boring is performed by punching from the perspective of productivity. Thus, improved punchability is often strongly required.

However, the technique described in Patent Literature 1 only prevents the intergranular segregation of P and improves hole expansion formability. Patent Literature 1 does not describe stamping workability. It is difficult to believe that the prevention of segregation of P in grain boundaries can directly improve punched surface properties and contribute to improved stamping workability.

With respect to improvement of stamping workability, for example, Patent Literature 2 proposes a high-strength hot-rolled steel sheet having a composition containing, on a mass percent basis, C: 0.01% to 0.07%, N: 0.005% or less, S: 0.005% or less, Ti: 0.03% to 0.2%, and B: 0.0002% to 0.002%, having a microstructure containing ferrite or bainitic ferrite as a main phase and a hard second phase and cementite, the hard second phase and cementite having an area fraction of 3% or less, and having good stamping workability. It is stated that a technique described in Patent Literature 2 can retain B in a solid solution state and thereby prevent defects in punched surfaces. In the technologies described in Patent Literature 2, ferrite or bainitic ferrite is the largest area phase, and the hard second phase, which adversely affects hole expandability, is limited to 3% or less.

Patent Literature 3 proposes a high-strength hot-rolled steel sheet having a tensile strength of 780 MPa or more and good punchability. The high-strength hot-rolled steel sheet has a composition containing, on a mass percent basis, C: 0.05% to 0.15%, Si: 0.1% to 1.5%, Mn: 1% to 2%, P: 0.03% or less, S: 0.003% or less, Al: 0.01% to 0.08%, Ti: 0.05% to 0.15%, and N: 0.005% or less and has a bainite phase having an area fraction of more than 95%. The average particle size of the bainite microstructure at a quarter thickness in the depth direction is 5 m or less in a vertical cross section parallel to the rolling direction and 4 µm or less in a vertical cross section perpendicular to the rolling direction. A region having a thickness of 1/10 of the sheet thickness at a central position in the thickness direction contains 7 or less crystal grains having an aspect ratio of 5 or more each spreading in the rolling direction. The technologies described in Patent Literature 3 is intended to improve punchability by decreasing the average particle size of bainite and by decreasing the number of spreading grains in a central region in the thickness direction.

PATENT LITERATURE

PTL 1: Japanese Patent No. 3889766 (Japanese Unexamined Patent Application Publication No. 2006-274318)
PTL 2: Japanese Unexamined Patent Application Publication No. 2004-315857
PTL 3: Japanese Unexamined Patent Application Publication No. 2012-62562

SUMMARY OF THE INVENTION

There are no particular specifications for evaluating the punchability of steel sheets. The punchability of steel sheets has been evaluated by using a method and conditions similar to those for boring before a hole-enlarging test according to a hole-enlarging test method specified in the Japan Iron and Steel Federation standard (JFS T1001). More specifically, in many cases, an approximately 100 mm×100 mm blank sheet is taken from a steel sheet in a laboratory. Then a 10-mmφ hole is punched in the blank sheet with a cylindrical punch (10 mmφ) having no wear damage while the clearance condition of 12%±1% of the thickness (thickness: 2 mm or more) is strictly satisfied and while the blank sheet is uniformly and firmly held. And then, the punchability of the steel sheet is evaluated by observing the fracture surface at an end face of the punched hole.

However, even steel sheets, particularly high-strength steel sheets, having good punchability as evaluated by such a method often have poor boring during stamping in mass production of parts.

In the technologies described in Patent Literature 2 and Patent Literature 3, the punchability of steel sheets is evaluated by punching a 10 mmϕ hole at a clearance corresponding to 17% to 23% of the thickness or 10% to 20% of the thickness, which is different from the punching clearance specified in JFS T1001. However, even high-strength steel sheets produced as steel sheets having good punchability by the technologies described in Patent Literature 2 and Patent Literature 3 often have poor boring during stamping in mass production and do not necessarily have good punchability in mass production. Thus, the quality of steel sheets must be further improved.

Aspects of the present invention aim to solve such problems of the related art and to provide a high-strength hot-rolled steel sheet having high strength and excellent punchability in mass production of parts and a method for producing the high-strength hot-rolled steel sheet.

Solution to Problem

In order to achieve the objects, the present inventors studied various factors that can affect punchability in mass production of high-strength hot-rolled steel sheets.

As a result, the present inventors first found a large difference between punchability evaluated by a method conforming to a known standard and punchability in mass production of actual parts. Also in actual mass production of parts, the punching clearance is adjusted at a timing of a die change. However, it is very difficult to completely adjust and manage the punching clearance within proper condition ranges, and therefore the clearance change generally happen caused by the circumferential position on a punched hole. Furthermore, punches have chipping and wear during mass production, and it is almost impossible to completely maintain and manage punches. This results in varying punching conditions. Furthermore, in mass production of actual parts, in addition to variations in punching clearance described above, depending on the part shape and the manufacturing process, boring by stamping is sometimes required in the middle of a mass production process. The present inventors have come to realize that in such a case, the punching direction may become oblique rather than vertical, or it is difficult to center a hole, and the sheet clamping conditions may deteriorate. Unlike stamping in laboratories, stamping in mass production is punching under very severe conditions and is subjected to various process variations as described above. The present inventors found that even steel sheets having good punchability as determined by punchability evaluation in laboratories in conformity with such a standard therefore often have poor boring during stamping in mass production of parts.

Considering such stamping conditions in mass production, the present inventors further studied a method for evaluating punchability in mass production. As a result, the present inventors first found that the punched hole diameter and the sheet clamping conditions as well as variations in punching clearance greatly influence the appearances of punched surfaces in stamping in mass production. As a result of further studies, the present inventors found that the best method for evaluating punchability in mass production includes using a 50-mmϕ punching punch of a flat-bottomed type, determining the hole diameter of a die such that the punching clearance is 30%, placing a spacer on the punching die, placing a blank sheet on the spacer, holding the blank sheet with a blank holder, and punching the blank sheet.

The present inventors intensively studied the effects of the steel sheet structure on punchability in mass production by this evaluation method. As a result, the present inventors found that size-controlling of a bainite phase for decreasing the size of the bainite phase alone is not enough to achieve the desired punchability in mass production, and additional microstructure controlling (elaboration or evolution of microstructure controlling) is required. As a result of further studies, the present inventors found that the microstructure unit that controls punchability in mass production is not only a macroscopic bainite microstructure but also the intervals of its lower microstructure, that is, bainite lath and carbide precipitation behavior.

The present inventors further studied and found that the punchability in mass production of a high-strength hot-rolled steel sheet is effectively and significantly improved by adjusting the rolling reduction and finishing temperature of finish rolling as well as the cooling timing and cooling rate control after the finish rolling within appropriate ranges, by forming a steel sheet microstructure composed mainly of a bainite phase, by decreasing the intervals of the lower microstructure bainite lath, and by causing iron based carbide to be precipitated in bainite lath grains, in addition to adjustment of the slab heating temperature.

Aspects of the present invention have been accomplished on the basis of these findings after further consideration. The following are aspects of the present invention.

(1) A high-strength hot-rolled steel sheet having good punchability in mass production, the high-strength hot-rolled steel sheet having a composition and a microstructure, the composition containing, on a mass percent basis, C: more than 0.07% and 0.2% or less, Si: 2.0% or less, Mn: 1.0% to 3.0%, P: 0.05% or less, S: 0.005% or less, Al: 0.1% or less, N: 0.01% or less, Ti: 0.05% to 0.3%, V: 0.05% to 0.3%, and the balance being Fe and incidental impurities, wherein the microstructure comprising a bainite of more than 90% by volume, the bainite having an average lath interval of 0.45 μm or less, and Fe-based carbide precipitated in bainite lath grains having a ratio of 10% or more by number to all Fe-based carbide.

(2) The high-strength hot-rolled steel sheet according to (1), wherein the composition further contains at least one selected from Nb: 0.005% to 0.2% and B: 0.0002% to 0.0030% on a mass percent basis.

(3) The high-strength hot-rolled steel sheet according to (1) or (2), wherein the composition further contains at least one selected from Cu: 0.005% to 0.3%, Ni: 0.005% to 0.3%, and Sn: 0.005% to 0.3% on a mass percent basis.

(4) The high-strength hot-rolled steel sheet according to any one of (1) to (3), wherein the composition further contains at least one selected from Mo: 0.002% to 0.3% and Cr: 0.002% to 0.3% on a mass percent basis.

(5) The high-strength hot-rolled steel sheet according to any one of (1) to (4), wherein the composition further contains at least one selected from Ca: 0.0002% to 0.004% and REM: 0.0002% to 0.004% on a mass percent basis.

(6) A hot-dip galvanized steel sheet having a hot-dip galvanizing layer or alloyed hot-dip galvanizing layer on a surface of the high-strength hot-rolled steel sheet according to any one of (1) to (5).

(7) A method for producing a high-strength hot-rolled steel sheet having good punchability in mass production, including: heating a steel slab and subjecting the steel slab to hot rolling having rough rolling and finish rolling to form a hot-rolled steel sheet, wherein the steel slab contains, on a mass percent basis, C: more than 0.07% and 0.2% or less, Si: 2.0% or less, Mn: 1.0% to 3.0%, P: 0.05% or less, S: 0.005% or less, Al: 0.1% or less, N: 0.01% or less, Ti: 0.05% to 0.3%, V: 0.05% to 0.3%, and the balance being Fe and incidental impurities, wherein the hot rolling includes heating the steel slab to 1100° C. or more, a total rolling reduction of two final passes in the finish rolling being 30% or more, a finish-rolling finishing temperature being in a range of ($A_{r3}$ transformation temperature) to ($A_{r3}$ transformation temperature+120° C.), starting cooling within 2 seconds after the finish rolling, cooling the hot-rolled steel sheet to a coiling temperature at an average cooling rate of 40° C./s or more, and coiling the hot-rolled steel sheet at a coiling temperature: 300° C. to 500° C.

(8) The method for producing a high-strength hot-rolled steel sheet according to (7), wherein the composition further contains at least one selected from Nb: 0.005% to 0.2% and B: 0.0002% to 0.0030% on a mass percent basis.

(9) The method for producing a high-strength hot-rolled steel sheet according to (7) or (8), wherein the composition further contains at least one selected from Cu: 0.005% to 0.3%, Ni: 0.005% to 0.3%, and Sn: 0.005% to 0.3% on a mass percent basis.

(10) The method for producing a high-strength hot-rolled steel sheet according to any one of (7) to (9), wherein the composition further contains at least one selected from Mo: 0.002% to 0.3% and Cr: 0.002% to 0.3% on a mass percent basis.

(11) The method for producing a high-strength hot-rolled steel sheet according to any one of (8) to (10), wherein the composition further contains at least one selected from Ca: 0.0002% to 0.004% and REM: 0.0002% to 0.004% on a mass percent basis.

(12) A method for producing a hot-dip galvanized steel sheet, including: pickling a high-strength hot-rolled steel sheet produced by the method for producing a high-strength hot-rolled steel sheet according to any one of (7) and (11), and subjecting the high-strength hot-rolled steel sheet to annealing and plating treatment to form a coated steel sheet, wherein the annealing is performed at a soaking temperature of 730° C. or less, and the plating treatment after the annealing includes passing the high-strength hot-rolled steel sheet through a hot-dip galvanizing bath to form a hot-dip galvanizing layer on a surface of the high-strength hot-rolled steel sheet and optionally subjecting the high-strength hot-rolled steel sheet to alloying treatment for alloying the hot-dip galvanizing layer.

(13) A high-strength hot-rolled steel sheet having good punchability in mass production and having a composition containing, on a mass percent basis, C: 0.05% to 0.15%, Si: 1.5% or less, Mn: 1.0% to 2.0%, P: 0.05% or less, S: 0.005% or less, Al: 0.1% or less, N: 0.01% or less, Ti: 0.05% to 0.2%, and the balance being Fe and incidental impurities, wherein the high-strength hot-rolled steel sheet has a microstructure comprising a bainite of more than 92% by volume, the bainite having an average lath interval of 0.6 m or less, and Fe-based carbide precipitated in bainite lath grains having a ratio of 10% or more by number to all Fe-based carbide.

(14) The high-strength hot-rolled steel sheet according to (13), wherein the composition further contains at least one selected from Nb: 0.005% to 0.2% and B: 0.0002% to 0.0030% on a mass percent basis.

(15) The high-strength hot-rolled steel sheet according to (13) or (14), wherein the composition further contains at least one selected from Cu: 0.005% to 0.3%, Ni: 0.005% to 0.3%, and Sn: 0.005% to 0.3% on a mass percent basis.

(16) The high-strength hot-rolled steel sheet according to any one of (13) to (15), wherein the composition further contains at least one selected from Mo: 0.002% to 0.3% and Cr: 0.002% to 0.3% on a mass percent basis.

(17) The high-strength hot-rolled steel sheet according to any one of (13) to (16), wherein the composition further contains at least one selected from Ca: 0.0002% to 0.004% and REM: 0.0002% to 0.004% on a mass percent basis.

(18) A hot-dip galvanized steel sheet having a hot-dip galvanizing layer or alloyed hot-dip galvanizing layer on a surface of the high-strength hot-rolled steel sheet according to any one of (13) to (17).

(19) A method for producing a high-strength hot-rolled steel sheet having good punchability in mass production, the method including: heating a steel slab and subjecting the steel slab to hot rolling having rough rolling and finish rolling to form a hot-rolled steel sheet, wherein the steel slab contains, on a mass percent basis, C: 0.05% to 0.15%, Si: 1.5% or less, Mn: 1.0% to 2.0%, P: 0.05% or less, S: 0.005% or less, Al: 0.1% or less, N: 0.01% or less, Ti: 0.05% to 0.2%, and the balance being Fe and incidental impurities, wherein the hot rolling includes heating the steel slab to 1100° C. or more, a total rolling reduction of two final passes in the finish rolling being 30% or more, a finish-rolling finishing temperature being in a range of ($A_{r3}$ transformation temperature) to ($A_{r3}$ transformation temperature+120° C.), starting cooling within 2 seconds after the finish rolling, cooling the hot-rolled steel sheet to a coiling temperature at an average cooling rate of 50° C./s or more, and coiling the hot-rolled steel sheet at a coiling temperature: 300° C. to 500° C.

(20) The method for producing a high-strength hot-rolled steel sheet according to (19), wherein the composition further contains at least one selected from Nb: 0.005% to 0.2% and B: 0.0002% to 0.0030% on a mass percent basis.

(21) The method for producing a high-strength hot-rolled steel sheet according to (19) or (20), wherein the composition further contains at least one selected from Cu: 0.005% to 0.3%, Ni: 0.005% to 0.3%, and Sn: 0.005% to 0.3% on a mass percent basis.

(22) The method for producing a high-strength hot-rolled steel sheet according to any one of (19) to (21), wherein the composition further contains at least one selected from Mo: 0.002% to 0.3% and Cr: 0.002% to 0.3% on a mass percent basis.

(23) The method for producing a high-strength hot-rolled steel sheet according to any one of (19) to (22), wherein the composition further contains at least selected from Ca: 0.0002% to 0.004% and REM: 0.0002% to 0.004% on a mass percent basis.

(24) A method for producing a hot-dip galvanized steel sheet, including: pickling a high-strength hot-rolled steel sheet produced by the method for producing a high-strength hot-rolled steel sheet according to any one of (19) and (23), and subjecting the high-strength hot-rolled steel sheet to annealing and plating treatment to form a coated steel sheet having a coated layer on a surface thereof, wherein the annealing is performed at a soaking temperature of 730° C. or less, and the plating treatment after the annealing includes passing the high-strength hot-rolled steel sheet through a hot-dip galvanizing bath to form a hot-dip galvanizing layer on a surface of the hot-rolled steel sheet and optionally subjecting the high-strength hot-rolled steel sheet to alloying treatment for alloying the hot-dip galvanizing layer.

(1) to (12) correspond to a first embodiment described below, and (13) to (24) correspond to a second embodiment described below.

In accordance with aspects of the present invention, a high-strength hot-rolled steel sheet that withstands severe stamping in mass production of parts and has good punchability in mass production can be easily produced as materials for automotive parts and the like. Thus, aspects of the present invention have industrially significant advantages. A high-strength hot-rolled steel sheet according to aspects of the present invention is suitable for truck frame parts and structural parts, such as members and frames, and underbody parts, such as suspensions, of automobile bodies in automobiles. Aspects of the present invention effectively contribute to weight reduction of parts.

DETAILED DESCRIPTION OF EMBODIMENTS OF THE INVENTION

First Embodiment

The reason for limiting the compositions of a high-strength hot-rolled steel sheet according to a first embodiment will be described below. Unless otherwise specified, "%" refers to "% by mass". The term "high-strength" in the embodiment refers to a tensile strength TS of 900 MPa or more.

C: More than 0.07% and 0.2% or Less

C is an element that effectively contributes to increase the strength of steel sheets and is a useful element that promotes bainite transformation and contributes to the formation of a bainite phase. An adequate C content results in increased carbide in bainite lath grains and improved punchability in mass production. These effects require a C content of more than 0.07%. An excessive C content of more than 0.2% results in poor workability and weldability. Thus, the C content is limited to more than 0.07% and 0.2% or less, preferably 0.079% or more, more preferably 0.10% or more, and preferably 0.19% or less.

Si: 2.0% or Less

Si is an element that increases the strength of steel sheets by solute strengthening and contributes to improved ductility of steel sheets. It is desirable that the Si content be 0.05% or more to produce these effects. However, an excessive Si content results in an increased transformation temperature and decreased formation of a bainite phase. A Si content of more than 2.0% results in marked Si type complex oxide invasion of crystal grain boundaries of a surface layer while a steel slab is heated, and the Si type complex oxide is difficult to remove by frequent descaling during hot rolling, thus resulting in poor appearances of punched surfaces during stamping in mass production of steel sheets and poor punchability in mass production. Thus, the Si content is limited to 2.0% or more, preferably 1.5% or less, more preferably 1.0% or less.

Mn: 1.0% to 3.0%

Mn is an effective element that contributes to increase the strength of steel sheets by solute strengthening and transformation strengthening. Furthermore, Mn functions to decrease the transformation temperature and decrease the size of bainite lath. These effects require a Mn content of 1.0% or more. However, an excessive Mn content of more than 3.0% results in significant center segregation and very poor workability. Thus, Mn is limited to the range of 1.0% to 3.0%, preferably 1.4% to 2.6%.

P: 0.05% or Less

P is an element that functions to increase the strength of steel sheets by solid solution. A high P content tends to result in segregation in grain boundaries and may adversely affect workability. Thus, it is desirable to minimize the P content. A P content up to 0.05% is allowable. Preferably, the P content is 0.03% or less.

S: 0.005% or Less

S forms sulfides. In particular, coarse sulfides reduce the ductility and workability of steel sheets. Thus, it is desirable to minimize the S content. A S content up to 0.005% is allowable. Thus, the S content is limited to 0.005% or less, preferably 0.003% or less, more preferably 0.0015% or less.

Al: 0.1% or Less

Al is an important element that functions as a deoxidizing agent for steel. It is desirable that the Al content be 0.01% or more to produce this effect. However, an Al content of more than 0.1% results in low castability and results in low surface quality and workability due to a large amount of residual inclusions (oxide) in steel. Thus, the Al content is limited to 0.1% or less, preferably 0.06% or less.

N: 0.01% or Less

N binds to a nitride-forming element and precipitates as a nitride, thereby contributing to a decreased size of crystal grains. However, a N content of more than 0.01% is responsible for low hot ductility and very poor burring formability due to the formation of a large amount of nitride. Thus, it is desirable to minimize the N content. A N content up to 0.01% is allowable. Thus, the N content is limited to 0.01% or less, preferably 0.006% or less, more preferably 0.004% or less.

Ti: 0.05% to 0.3%

Ti is one of the most important elements in accordance with aspects of the present invention. Ti tends to form a carbonitride and decreases the size of austenite (γ) grains before transformation, thereby contributing to decreased lath intervals of bainite after transformation. Furthermore, Ti increases carbide (carbonitride) in fine bainite lath grains, contributes to increased strength by precipitation strengthening, increases void forming sites in stamping, and contributes to improved punchability in mass production. These effects require a Ti content of 0.05% or more. However, an excessive Ti content of more than 0.3% results in very large rolling force, thereby making rolling operation difficult, or results in excessively coarse precipitates, thereby reducing workability. Thus, the Ti content is limited to the range of 0.05% to 0.3%, preferably 0.07% to 0.25%, more preferably 0.07% to 0.23%.

V: 0.05% to 0.3%

V functions to improve a strength-elongation balance and a strength-hole expandability balance and is one of the most important elements in accordance with aspects of the present invention. V also functions to decrease the lath intervals of bainite, thereby decreasing the occurrence intervals of micro voids in punching, facilitating linking between voids, and improving punchability in mass production. V also functions to decrease precipitation of coarse Fe-based carbide, thereby improving edge face properties in punching. These effects require a V content of 0.05% or more. An excessive V content of more than 0.3% cannot lead to further improvements of these effects, thus increasing production costs and resulting in economic disadvantages. Thus, the V content is limited to the range of 0.05% to 0.3%, preferably 0.07% or more, more preferably 0.22% or more, and preferably 0.28% or less, more preferably 0.26% or less.

These components are basic components. In accordance with aspects of the present invention, in addition to this basic composition, the following optional elements may be contained, if necessary: one or two selected from Nb: 0.005% to 0.2% and B: 0.0002% to 0.0030%, and/or one or two or more selected from Cu: 0.005% to 0.3%, Ni: 0.005% to 0.3%, and Sn: 0.005% to 0.3%, and/or one or two selected from Mo: 0.002% to 0.3% and Cr: 0.002% to 0.3%, and/or one or two selected from Ca: 0.0002% to 0.004% and REM: 0.0002% to 0.004%.

At Least One Selected from Nb: 0.005% to 0.2% and B: 0.0002% to 0.0030%

Nb and B are elements that contribute to improved punchability in mass production. If necessary, one or both of Nb and B may be contained.

Nb contributes to a finer microstructure and finely-dispersed carbide by the formation of precipitates (carbonitride), thereby decreasing the occurrence intervals of micro voids in punching and improving punchability in mass production. These effects preferably require a Nb content of 0.005% or more. However, an excessive Nb content of more than 0.2% results in coarse precipitates, poor workability, and increased production costs. Thus, if Nb is contained, the Nb content is preferably limited to the range of 0.005% to 0.2%, more preferably 0.005% to 0.15%.

B decreases the lath intervals of bainite and thereby contributes to improved punchability in mass production. These effects preferably require a B content of 0.0002% or more. However, an excessive B content of more than 0.0030% results in poor workability. Thus, if B is contained, the B content is preferably limited to the range of 0.0002% to 0.0030%, more preferably 0.0003% to 0.0020%.

At Least One Selected from Cu: 0.005% to 0.3%, Ni: 0.005% to 0.3%, and Sn: 0.005% to 0.3%

Cu, Ni, and Sn are elements that contribute to increased strength by solute strengthening. If necessary, one or two or more of Cu, Ni, and Sn may be contained. It is desirable to contain Cu: 0.005% or more, Ni: 0.005% or more, and/or Sn: 0.005% or more to produce the effect. However, a Cu content of more than 0.3%, a Ni content of more than 0.3%, and/or a Sn content of more than 0.3% results in poor hot workability and may result in surface layer cracking during hot rolling. Thus, if Cu, Ni, and/or Sn are contained, each of the Cu content, the Ni content, and the Sn content is preferably limited to the range of 0.005% to 0.3%, more preferably 0.005% to 0.2%.

At Least One Selected from Mo: 0.002% to 0.3% and Cr: 0.002% to 0.3%

Mo and Cr are elements that tend to form carbide (precipitates) and contribute to improved punchability in mass production by the formation of the precipitates. Mo and Cr are also elements that contribute to improved hardenability. Mo and Cr are also elements that contribute to finer bainite lath by decreasing the bainite transformation temperature. One or both of Mo and Cr may be contained, if necessary. It is desirable to contain Mo: 0.002% or more and/or Cr: 0.002% or more to produce these effects. However, an excessive Mo content of more than 0.3% and/or an excessive Cr content of more than 0.3% results in increased production costs and economic disadvantages. Thus, if Mo and/or Cr is contained, each of the Mo content and the Cr content is preferably limited to the range of 0.002% to 0.3%, more preferably 0.002% to 0.2%.

At Least One Selected from Ca: 0.0002% to 0.004% and REM: 0.0002% to 0.004%

Ca and REM are elements that effectively contribute to improved workability by morphology control of inclusions. If necessary, one or both of Ca and REM may be contained. It is desirable to contain Ca: 0.0002% or more and/or REM: 0.0002% or more to produce the effect. However, a Ca content of more than 0.004% and/or a REM content of more than 0.004% results in an increased amount of inclusions in steel and poor workability. Thus, if Ca and/or REM is contained, each of the Ca content and the REM content is preferably limited to the range of 0.0002% to 0.004%, more preferably 0.0002% to 0.003%.

The balance other than the components described above includes Fe and incidental impurities.

The reason for limiting the microstructure of a high-strength hot-rolled steel sheet according to aspects of the present invention will be described below.

A high-strength hot-rolled steel sheet according to aspects of the present invention has a microstructure in which a bainite phase constitutes more than 90% by volume, the average lath interval of bainite is 0.45 µm or less, and the ratio of Fe-based carbide precipitated in bainite lath grains to all Fe-based carbide is 10% or more.

In order to achieve the desired punchability in mass production, it is important that a bainite phase should constitute more than 90%, preferably more than 92%, more preferably more than 94%, by volume of the steel sheet structure, as described above.

The bainite phase is a mixed microstructure of ferrite and Fe-based carbide. In such a microstructure composed mainly of the bainite phase alone, an interface between ferrite and Fe-based carbide acts as a starting point for the formation of micro voids during punching. Thus, such a microstructure is advantageous to both appropriate formation of micro voids and subsequent void linking.

In accordance with aspects of the present invention, the intervals of bainite lath, which is the lower microstructure of the bainite phase, are 0.45 µm or less. This is based on the finding that a smaller bainite phase and a finer lower microstructure (decreased lath intervals of bainite) are important in achieving the desired punchability in mass production. When the lath intervals of bainite are more than 0.45 µm, the desired punchability in mass production cannot be achieved. Thus, the lath intervals of bainite are limited to 0.45 µm or less, preferably 0.40 µm or less, more preferably 0.35 µm or less. A second phase other than the bainite phase (the remainder) includes one or more of martensite, retained austenite, ferrite, and pearlite.

In accordance with aspects of the present invention, in order to achieve the desired punchability in mass production, the bainite phase in the microstructure contains carbide formed therein, and the ratio of Fe-based carbide precipitated in ferrite grains to all precipitated Fe-based carbide in the microstructure is 10% or more by number. When the ratio of Fe-based carbide precipitated in ferrite grains to all precipitated Fe-based carbide is less than 10% by number, the desired punchability in mass production cannot be achieve. Thus, the ratio of Fe-based carbide precipitated in grains to all Fe-based carbide is limited to 10% or more, preferably 15% or more, more preferably 20% or more, by number.

A preferred method for producing a high-strength hot-rolled steel sheet according to aspects of the present invention will be described below.

In accordance with aspects of the present invention, a steel slab having the composition described above is heated and is subjected to hot rolling composed of rough rolling and finish rolling to form a hot-rolled steel sheet.

A method for producing a steel slab is not particularly limited. Molten steel having the composition described above is formed by a common melting method, for example, in a converter, an electric furnace, or an induction furnace, and, if necessary, is subjected to secondary refining in vacuum degassing equipment, and is formed into a steel slab having predetermined dimensions by a common casting method, such as by continuous casting. An ingot making and blooming method may also be used without problems. The steel slab may be a thin slab having a thickness of approximately 30 mm. In the case of a thin slab, rough rolling may be omitted.

In accordance with aspects of the present invention, an electro-magnetic stirrer (EMS) or intentional bulging soft reduction casting (IBSR) may be used to reduce segregation of steel components during continuous casting. Electro-magnetic stirrer treatment can form equiaxed crystals at half the thickness of a sheet and reduce segregation. Intentional bulging soft reduction casting can prevent the flow of molten steel in an unsolidified portion of a continuous cast slab and reduce segregation at half the thickness of a sheet. At least one of these segregation reduction treatments can be used to improve good punchability characteristic of aspects of the present invention and improve elongation among the tensile properties described below.

A steel slab is heated to a heating temperature of 1100° C. or more and is subjected to hot rolling.
Steel Slab Heating Temperature: 1100° C. or More In accordance with aspects of the present invention, precipitates in a slab must be redissolved. Thus, a steel slab is heated to a heating temperature of 1100° C. or more. A heating temperature of less than 1100° C. results in insufficient redissolution of precipitates, and a desired precipitate distribution cannot be achieved in a subsequent process. The heating temperature is preferably 1150° C. or more. An excessively high heating temperature results in coarse crystal grains and consequently coarse bainite lath. Thus, it is desirable that the heating temperature of a steel slab be limited to 1300° C. or less.

A heated steel slab is subjected to hot rolling composed of rough rolling and finish rolling to form a hot-rolled steel sheet. The rough rolling may be performed under any conditions where a desired sheet bar size can be achieved.

The rough rolling is followed by finish rolling. The conditions for the finish rolling are very important for the formation of a desired bainite lath microstructure.
Total Rolling Reduction of Two Final Passes in Finish Rolling: 30% or More Formation of a desired bainite lath microstructure requires bainite transformation of austenite ($\gamma$) having sufficiently accumulated strain. Thus, in accordance with aspects of the present invention, the total rolling reduction of two final passes in finish rolling is limited. When the total rolling reduction of two final passes in finish rolling is less than 30%, strain is insufficiently accumulated in $\gamma$, and a desired bainite lath microstructure cannot be formed after transformation. Thus, the total rolling reduction of two final passes in finish rolling is limited to 30% or more, preferably 40% or more, more preferably 50% or more.
Finish-Rolling Finishing Temperature: ($A_{r3}$ Transformation Temperature) to ($A_{r3}$ Transformation Temperature+120° C.)

Finish-rolling finishing temperature control is also important for bainite transformation of austenite ($\gamma$) having sufficiently accumulated strain. When the finish-rolling finishing temperature is less than the $A_{r3}$ transformation temperature, it is difficult to form the desired microstructure, that is, the microstructure composed mainly of a bainite phase alone. When the finish-rolling finishing temperature is higher than ($A_{r3}$ transformation temperature+120° C.), it is difficult to form a fine bainite phase. Thus, the finish-rolling finishing temperature is limited to ($A_{r3}$ transformation temperature) to ($A_{r3}$ transformation temperature+120° C.), preferably ($A_{r3}$ transformation temperature) to ($A_{r3}$ transformation temperature+80° C.). The finish-rolling finishing temperature herein refers to a surface temperature. The term "$A_{r3}$ transformation temperature", as used herein, refers to a transformation temperature determined from a changing point in a thermal expansion curve obtained by cooling at a cooling rate of 1° C./s after processing with a Formastor testing machine (Thermecmastor-Z).

After the finish rolling, cooling is performed. The cooling conditions are also very important for the formation of a desired microstructure.
Cooling Start: Within 2 Seconds after Finish Rolling In order to form a desired bainite lath microstructure by bainite transformation of $\gamma$ (austenite) having sufficiently accumulated strain, cooling must be started within 2 seconds after finish rolling. When cooling is started more than 2 seconds after finish rolling, recovery of $\gamma$ and recrystallization occur, and the number of nuclei for bainite transformation decreases. Thus, the desired bainite lath microstructure cannot be formed. Thus, cooling is started within 2 seconds, preferably 1.5 seconds, more preferably 1 second, after finish rolling.
Average Cooling Rate: 40° C./s or More When the average cooling rate from the finish-rolling finishing temperature to the cooling stop temperature is less than 40° C./s, pro-eutectoid ferrite is precipitated, making it difficult to form the microstructure in which a bainite phase constitutes more than 90% by volume and that has the desired lath intervals of bainite. Thus, the average cooling rate of cooling after finish rolling is limited to 40° C./s or more, preferably 50° C./s or more, more preferably 60° C./s or more. The upper limit of the cooling rate depends on the capacity of cooling facilities and is preferably approximately 150° C./s or less in terms of the shape of steel sheets. In accordance with aspects of the present invention, control of the cooling rate after finish rolling as described above and single-stage cooling to the cooling stop temperature as described below are among the requirements for the formation of the microstructure characteristic of aspects of the present invention.
Cooling Stop Temperature: 300° C. to 500° C.

In accordance with aspects of the present invention, coiling is performed immediately after cooling stop. Thus, the coiling temperature is the same as the cooling stop temperature. When the cooling stop temperature (coiling temperature) is less than 300° C. or more than 500° C., the lath intervals of bainite and the Fe-based carbide distribution cannot be controlled within desired optimum ranges. Thus, the cooling stop temperature (coiling temperature) is limited to the range of 300° C. to 500° C., preferably 350° C. to 500° C.

After coiling, scales on the surface may be removed by pickling according to routine procedures. After pickling treatment, a hot-rolled steel sheet may be subjected to temper rolling. After pickling treatment or temper rolling, a hot-rolled steel sheet may be annealed at a soaking temperature of 730° C. or less and may be passed through a hot-dip galvanizing bath to form a galvanized layer on the surface thereof, thereby producing a hot-dip galvanized steel sheet. When the soaking temperature for annealing treatment is more than 730° C., bainite is tempered, making it difficult to form the microstructure in which a bainite phase constitutes more than 90% by volume and that has the desired lath intervals of bainite. Thus, the soaking temperature for annealing treatment is 730° C. or less. Although the lower limit of the annealing temperature is not particularly limited, the soaking temperature for annealing treatment is preferably 600° C. or more in terms of adhesion between a hot-dip galvanizing layer and a base steel sheet. After immersed in the hot-dip galvanizing bath, the galvanized layer may be subjected to alloying treatment to produce a galvannealed steel sheet.

The resulting hot-rolled steel sheet may be used to produce a coated steel sheet, such as an electrogalvanized steel sheet, as well as a hot-dip galvanized steel sheet.

A high-strength hot-rolled steel sheet according to aspects of the present invention will be described below with examples.

Example 1

A steel slab having a composition listed in Table 1 was subjected to heating, finish rolling, and cooling after rolling listed in Table 2 to produce a hot-rolled steel sheet. In continuous casting, hot-rolled steel sheets other than a hot-rolled steel sheet No. 1' of steel A1 in Tables 1 to 3 described below were subjected to an electro-magnetic stirrer (EMS) to reduce segregation of components of the steel. Table 1 also lists the $A_{r3}$ transformation temperature of each steel slab determined from a thermal expansion curve. After pickling, some of the hot-rolled steel sheets were passed through a continuous hot-dip galvanizing line and were subjected to annealing treatment under the conditions listed in Table 2 and hot-dip galvanizing treatment to produce hot-dip galvanized steel sheets (GI). In the hot-dip galvanizing treatment, each of the hot-rolled steel sheets subjected to the annealing treatment was immersed in a galvanizing bath (0.1% by mass Al—Zn) at 480° C., and 45 g/m² of a hot-dip galvanized layer was formed on each side of the steel sheet. After the hot-dip galvanizing treatment, some of the hot-rolled steel sheets were subjected to alloying treatment to produce galvannealed steel sheets (GA). The alloying treatment temperature was 520° C.

Test specimens were taken from the hot-rolled steel sheets (including coated steel sheets) and were subjected to microstructure observation, a tensile test, and a punchability-in-mass-production test. The test methods were as follows:

(1) Microstructure Observation

Test specimens for microstructure observation were taken from the hot-rolled steel sheets (coated steel sheets). A vertical cross section (L cross section) of each test specimen parallel to the rolling direction was polished and was etched with a 3% nital solution to expose a microstructure. The microstructure in the L cross section at a quarter thickness in the depth direction was observed with a scanning electron microscope (magnification: 3000 times). Ten visual fields of the microstructure were photographed. Phases other than a bainite phase were separated by image analysis to determine the percentage of the phases other than bainite and calculate the area percentage of the bainite phase. The area percentage calculated in this manner was considered to be the volume percentage of the bainite phase.

Samples for a thin film were taken from the hot-rolled steel sheets (coated steel sheets) at a quarter thickness in the depth direction and were subjected to mechanical polishing and electropolishing to prepare thin film specimens. The microstructure of each thin film specimen was observed with a transmission electron microscope (magnification: approximately 30000). Ten visual fields of the microstructure were photographed. The lath intervals of bainite were measured and were averaged to determine the lath intervals of bainite of each hot-rolled steel sheet.

Test specimens for microstructure observation were taken from the hot-rolled steel sheets (coated steel sheets). A vertical cross section (L cross section) of each test specimen parallel to the rolling direction was polished and was etched with a 3% nital solution to expose a microstructure. A replica sample at a quarter thickness in the depth direction was prepared. The microstructure of the replica sample was observed a transmission electron microscope (magnification: approximately 30000 times). Ten visual fields of the microstructure were photographed. The number of Fe precipitates was measured in each precipitation site (at a grain boundary and within a grain) in the microstructure photographs, thereby calculating the ratio of the number of Fe precipitates in bainite lath grains to the number of all Fe precipitates. Fe precipitates were identified by the shape of the precipitates and by energy dispersive X-ray (EDX) analysis.

It was confirmed that substantially the same microstructure was also observed in a central portion in the thickness direction.

(2) Tensile Test

Three JIS No. 5 tensile test pieces were taken from each of the hot-rolled steel sheets (coated steel sheets) such that the tensile direction was perpendicular to the rolling direction. The test pieces were subjected to a tensile test according to JIS Z 2241. The cross head speed was 10 mm/min. The averages of tensile properties (tensile strength TS and elongation El) were considered to be the tensile properties of the steel sheets.

(3) Punchability-in-Mass-Production Test

A blank sheet (size: 150×150 mm) was taken from each of the hot-rolled steel sheets (coated steel sheets). A 50-mmφ punching punch of a flat-bottomed type was used. The hole diameter of a die was determined such that the punching clearance was 30%. A spacer was placed on the punching die. A blank sheet was placed on the spacer and was held with a blank holder. A hole was then punched in the blank sheet. After punching, the fracture surface condition of the punched surface was observed around the entire perimeter of the punched hole with a scanning electron microscope (magnification: 100 times) and was checked for cracking, chipping, a brittle fracture surface, a secondary shear surface, and cross section roughness. Punchability in mass production was rated as follows: fracture surfaces free of cracking, chipping, a brittle fracture surface, a secondary shear surface, and cross section roughness were rated as good (circle); fracture surfaces having cross section roughness were rated as fair (triangle); and the other fracture surfaces were rated as poor (x).

Table 3 shows the results.

TABLE 1

| Steel No. | Chemical composition (mass %) | | | | | | | | | | | | Transformation temperature $A_{r3}$ (° C.) | Remarks |
| --- | --- | --- | --- | --- | --- | --- | --- | --- | --- | --- | --- | --- | --- | --- |
| | C | Si | Mn | P | S | Al | N | Ti | V | Nb, B | Cu, Ni, Sn | Mo, Cr | Ca, REM | | |
| A1 | 0.079 | 0.17 | 1.66 | 0.047 | 0.0029 | 0.044 | 0.0034 | 0.078 | 0.259 | Nb: 0.008 | — | — | Ca: 0.0013 | 894 | Suitable example |

TABLE 1-continued

| Steel No. | Chemical composition (mass %) | | | | | | | | | | | | | Transformation temperature $A_{r3}$ (° C.) | Remarks |
|---|---|---|---|---|---|---|---|---|---|---|---|---|---|---|---|
| | C | Si | Mn | P | S | Al | N | Ti | V | Nb, B | Cu, Ni, Sn | Mo, Cr | Ca, REM | | |
| B1 | 0.102 | 0.75 | 1.11 | 0.023 | 0.0004 | 0.019 | 0.0042 | 0.159 | 0.097 | B: 0.0011 | — | — | — | 911 | Suitable example |
| C1 | 0.123 | 1.42 | 2.38 | 0.007 | 0.0019 | 0.038 | 0.0021 | 0.109 | 0.179 | Nb: 0.004 | Sn: 0.04 | — | — | 886 | Suitable example |
| D1 | 0.141 | 0.69 | 1.99 | 0.011 | 0.0005 | 0.033 | 0.0033 | 0.118 | 0.198 | — | — | — | — | 863 | Suitable example |
| E1 | 0.159 | 0.41 | 1.59 | 0.013 | 0.0009 | 0.044 | 0.0027 | 0.133 | 0.223 | — | — | — | — | 859 | Suitable example |
| F1 | 0.108 | 0.08 | 1.72 | 0.027 | 0.0014 | 0.024 | 0.0062 | 0.124 | 0.147 | — | Ni: 0.22 | Cr: 0.09, Mo: 0.03 | REM: 0.0025 | 864 | Suitable example |
| G1 | 0.116 | 0.75 | 1.89 | 0.005 | 0.0004 | 0.066 | 0.0011 | 0.069 | 0.288 | B: 0.0004 | — | Cr: 0.03 | — | 871 | Suitable example |
| H1 | 0.137 | 0.27 | 2.47 | 0.011 | 0.0009 | 0.042 | 0.0048 | 0.168 | 0.129 | — | — | Mo: 0.09 | — | 831 | Suitable example |
| I1 | 0.185 | 0.01 | 2.57 | 0.017 | 0.0011 | 0.046 | 0.0037 | 0.138 | 0.226 | Nb: 0.014 | — | — | — | 808 | Suitable example |
| J1 | 0.088 | 0.04 | 2.83 | 0.009 | 0.0038 | 0.039 | 0.0024 | 0.252 | 0.059 | — | Cu: 0.04, Ni: 0.08 | — | — | 823 | Suitable example |
| K1 | 0.068 | 0.08 | 0.94 | 0.013 | 0.0011 | 0.049 | 0.0048 | 0.143 | 0.213 | — | — | — | — | 891 | Comparative example |
| L1 | 0.104 | 0.03 | 1.84 | 0.011 | 0.0028 | 0.058 | 0.0053 | 0.044 | 0.258 | — | — | — | — | 848 | Comparative example |
| M1 | 0.095 | 1.39 | 1.13 | 0.023 | 0.0025 | 0.033 | 0.0028 | 0.128 | 0.050 | — | — | — | Ca: 0.0025 | 942 | Suitable example |
| N1 | 0.114 | 0.76 | 1.26 | 0.019 | 0.0009 | 0.055 | 0.0039 | 0.068 | 0.009 | Nb: 0.009 | — | — | — | 901 | Comparative example |

TABLE 2

| Hot-rolled steel sheet No. | Steel No. | Sheet thickness mm | Hot-rolling conditions | | | Cooling conditions | | Coiling conditions | Hot-dip galvanizing treatment | | Remarks |
|---|---|---|---|---|---|---|---|---|---|---|---|
| | | | Heating temperature (° C.) | Finish-rolling finishing temperature (° C.) | Total rolling reduction of two final passes (%) | Cooling start time (s) | Average cooling rate* (° C./s) | Coiling temperature (° C.) | Annealing temperature (° C.) | Alloying treatment | |
| 1 | A1 | 2.9 | 1180 | 905 | 35 | 1.3 | 65 | 425 | — | — | Example |
| 1' | A1 | 2.9 | 1180 | 900 | 35 | 1.4 | 60 | 425 | — | — | Example |
| 2 | B1 | 2.6 | 1290 | 950 | 40 | 0.9 | 80 | 450 | — | — | Example |
| 3 | B1 | 2.0 | 1290 | 915 | 45 | 0.8 | 90 | 440 | 605 | — | Example |
| 4 | B1 | 2.6 | 1290 | 920 | 45 | 1.3 | 80 | 480 | 785 | — | Comparative example |
| 5 | B1 | 2.6 | 1290 | 915 | 50 | 2.5 | 55 | 385 | — | — | Comparative example |
| 6 | C1 | 4.0 | 1220 | 890 | 35 | 1.4 | 60 | 430 | — | — | Example |
| 7 | D1 | 2.6 | 1250 | 920 | 60 | 0.8 | 100 | 400 | — | — | Example |
| 8 | D1 | 2.0 | 1250 | 840 | 45 | 1.4 | 125 | 420 | — | — | Comparative example |
| 9 | D1 | 2.6 | 1250 | 880 | 20 | 1.7 | 95 | 495 | — | — | Comparative example |
| 10 | E1 | 3.6 | 1260 | 900 | 55 | 0.6 | 90 | 415 | 680 | Yes | Example |
| 11 | E1 | 3.6 | 1260 | 910 | 50 | 1.4 | 25 | 440 | 645 | — | Comparative example |
| 12 | E1 | 2.6 | 1260 | 930 | 50 | 1.8 | 80 | 275 | — | — | Comparative example |
| 13 | F1 | 3.6 | 1260 | 870 | 30 | 1.9 | 40 | 495 | — | — | Example |
| 14 | G1 | 2.0 | 1200 | 940 | 40 | 1.2 | 145 | 400 | — | — | Example |
| 15 | H1 | 4.0 | 1290 | 850 | 40 | 0.7 | 50 | 355 | — | — | Example |
| 16 | I1 | 2.6 | 1280 | 920 | 35 | 1.6 | 125 | 325 | — | — | Example |
| 17 | J1 | 2.0 | 1290 | 900 | 50 | 1.1 | 75 | 405 | 725 | — | Example |
| 18 | K1 | 3.6 | 1290 | 895 | 55 | 1.9 | 60 | 490 | — | — | Comparative example |
| 19 | L1 | 3.6 | 1250 | 900 | 40 | 1.4 | 90 | 480 | 705 | — | Comparative example |
| 20 | M1 | 3.6 | 1250 | 945 | 45 | 1.1 | 45 | 530 | — | — | Comparative example |

TABLE 2-continued

| Hot-rolled steel sheet No. | Steel No. | Sheet thickness mm | Hot-rolling conditions | | | Cooling conditions | | Coiling conditions | Hot-dip galvanizing treatment | | Remarks |
|---|---|---|---|---|---|---|---|---|---|---|---|
| | | | Heating temperature (° C.) | Finish-rolling finishing temperature (° C.) | Total rolling reduction of two final passes (%) | Cooling start time (s) | Average cooling rate* (° C./s) | Coiling temperature (° C.) | Annealing temperature (° C.) | Alloying treatment | |
| 21 | N1 | 3.6 | 1280 | 905 | 50 | 1.7 | 55 | 410 | — | — | Comparative example |

*Average cooling rate from finish-rolling finishing temperature to coiling temperature

TABLE 3

| Hot-rolled steel sheet No. | Steel No. | Structure** | | | Tensile properties | | Punchability in mass production Evaluation of punched surface | Remarks |
|---|---|---|---|---|---|---|---|---|
| | | Bainite fraction (vol %) | Lath interval of bainite (μm) | Ratio of Fe-based carbide in grains* (%) | Tensile strength TS (MPa) | Elongation El (%) | | |
| 1 | A1 | 91 | 0.37 | 11.6 | 903 | 20 | ○ | Example |
| 1' | A1 | 92 | 0.36 | 11.5 | 905 | 18 | Δ | Example |
| 2 | B1 | 94 | 0.28 | 15.9 | 985 | 17 | ○ | Example |
| 3 | B1 | 93 | 0.25 | 13.3 | 982 | 16 | ○ | Example |
| <u>4</u> | B1 | <u>72</u> | <u>1.25</u> | 12.4 | 954 | 8 | x | Comparative example |
| <u>5</u> | B1 | 94 | <u>0.88</u> | 10.0 | 985 | 13 | x | Comparative example |
| 6 | C1 | 95 | 0.33 | 15.2 | 991 | 17 | ○ | Example |
| 7 | D1 | 98 | 0.26 | 20.2 | 996 | 19 | ○ | Example |
| <u>8</u> | D1 | <u>63</u> | <u>0.65</u> | <u>6.3</u> | 986 | 11 | x | Comparative example |
| <u>9</u> | D1 | <u>82</u> | <u>0.93</u> | <u>5.1</u> | 971 | 12 | x | Comparative example |
| 10 | E1 | 97 | 0.23 | 23.1 | 1008 | 19 | ○ | Example |
| <u>11</u> | E1 | <u>68</u> | <u>0.55</u> | 12.8 | 997 | 10 | x | Comparative example |
| <u>12</u> | E1 | <u>81</u> | 0.21 | <u>2.1</u> | 1010 | 11 | x | Comparative example |
| 13 | F1 | 90.5 | 0.44 | 28.5 | 956 | 16 | ○ | Example |
| 14 | G1 | 93 | 0.19 | 18.8 | 1005 | 15 | ○ | Example |
| 15 | H1 | 95 | 0.15 | 13.4 | 1106 | 14 | ○ | Example |
| 16 | I1 | 96 | 0.11 | 10.3 | 1183 | 13 | ○ | Example |
| 17 | J1 | 94 | 0.39 | 15.8 | 922 | 19 | ○ | Example |
| <u>18</u> | K1 | <u>83</u> | <u>0.94</u> | 16.5 | 934 | 11 | x | Comparative example |
| <u>19</u> | L1 | 98 | <u>0.56</u> | <u>5.4</u> | 886 | 12 | x | Comparative example |
| <u>20</u> | M1 | 93 | <u>0.78</u> | <u>8.8</u> | 981 | 13 | x | Comparative example |
| <u>21</u> | N1 | 97 | <u>0.47</u> | <u>6.7</u> | 984 | 14 | x | Comparative example |

*Number ratio of Fe-based carbide in grains to all Fe-based carbide
**Measurement at quarter thickness The hot-rolled steel sheets (coated steel sheets) according to the examples had a high tensile strength TS of 900 MPa or more and good punchability in mass production. In contrast, the comparative examples outside the scope of the present invention had poor punchability in mass production.

Second Embodiment

The reason for limiting the compositions of a high-strength hot-rolled steel sheet according to a second embodiment will be described below. Unless otherwise specified, "%" refers to "% by mass". The term "high-strength" in the second embodiment refers to a tensile strength TS in the range of 700 to 900 MPa.

C: 0.05% to 0.15%

C is an element that effectively contributes to increase the strength of steel sheets and is a useful element that promotes bainite transformation and contributes to the formation of a bainite phase. An adequate C content results in increased carbide in bainite lath grains and improved punchability in mass production. These effects require a C content of 0.05% or more. An excessive C content of more than 0.15% results in poor workability and weldability. Thus, the C content is limited to the range of 0.05% to 0.15%, preferably 0.071% or more, more preferably 0.080% or more, and 0.14% or less.

Si: 1.5% or Less

Si is an element that increases the strength of steel sheets by solute strengthening and contributes to improved ductility of steel sheets. It is desirable that the Si content be 0.05% or more to produce these effects. However, an excessive Si content of more than 1.5% results in an increased transformation temperature and decreased formation of a bainite phase. Thus, the Si content is limited to 1.5% or less, preferably 1.0% or less.

Mn: 1.0% to 2.0%

Mn is an effective element that contributes to increase the strength of steel sheets by solute strengthening and transformation strengthening. Furthermore, Mn functions to decrease the transformation temperature and decrease the size of bainite lath. These effects require a Mn content of 1.0% or more. However, a Mn content of more than 2.0% results in significant center segregation and very poor workability. Thus, the Mn content is limited to the range of 1.0% to 2.0%, preferably 1.2% to 1.9%.

P: 0.05% or Less

P is an element that functions to increase the strength of steel sheets by solid solution. A high P content tends to result in segregation in grain boundaries and may adversely affect workability. Thus, it is desirable to minimize the P content. A P content up to 0.05% is allowable. Preferably, the P content is 0.03% or less.

S: 0.005% or Less

S forms sulfides. In particular, coarse sulfides reduce the ductility and workability of steel sheets. Thus, it is desirable to minimize the S content. A S content up to 0.005% is allowable. Thus, the S content is limited to 0.005% or less, preferably 0.003% or less, more preferably 0.0015% or less.

Al: 0.1% or Less

Al is an important element that functions as a deoxidizing agent for steel. It is desirable that the Al content be 0.01% or more to produce this effect. However, an Al content of more than 0.1% results in low castability and results in low surface quality and workability due to a large amount of residual inclusions (oxide) in steel. Thus, the Al content is limited to 0.1% or less, preferably 0.06% or less.

N: 0.01% or Less

N binds to a nitride-forming element and precipitates as a nitride, thereby contributing to a decreased size of crystal grains. However, a N content of more than 0.01% is responsible for low hot ductility and very poor burring formability due to the formation of a large amount of nitride. Thus, it is desirable to minimize the N content. A N content up to 0.01% is allowable. Thus, the N content is limited to 0.01% or less, preferably 0.006% or less, more preferably 0.004% or less.

Ti: 0.05% to 0.2%

Ti is one of the most important elements in accordance with aspects of the present invention. Ti tends to form a carbonitride and decreases the size of austenite (γ) grains before transformation, thereby contributing to decreased lath intervals of bainite after transformation. Furthermore, Ti increases carbide (carbonitride) in fine bainite lath grains, contributes to increased strength by precipitation strengthening, acts as a void forming site and increases voids in stamping, and contributes to improved punchability in mass production. These effects require a Ti content of 0.05% or more. However, an excessive Ti content of more than 0.2% results in very large rolling force, thereby making rolling operation difficult, or results in excessively coarse precipitates, thereby reducing workability. Thus, the Ti content is limited to the range of 0.05% to 0.2%, preferably 0.065% to 0.125%, more preferably 0.065% to 0.10%.

These components are basic components. In accordance with aspects of the present invention, in addition to this basic composition, the following optional elements may be contained, if necessary: one or two selected from Nb: 0.005% to 0.2% and B: 0.0002% to 0.0030%, and/or one or two or more selected from Cu: 0.005% to 0.3%, Ni: 0.005% to 0.3%, and Sn: 0.005% to 0.3%, and/or one or two selected from Mo: 0.002% to 0.3% and Cr: 0.002% to 0.3%, and/or one or two selected from Ca: 0.0002% to 0.004% and REM: 0.0002% to 0.004%.

One or two selected from Nb: 0.005% to 0.2% and B: 0.0002% to 0.0030%

Nb and B are elements that contribute to improved punchability in mass production. If necessary, one or both of Nb and B may be contained.

Nb contributes to a finer microstructure and finely-dispersed carbide by the formation of precipitates (carbonitride), thereby decreasing the occurrence intervals of micro voids in stamping and improving punchability in mass production. These effects preferably require a Nb content of 0.005% or more. However, an excessive Nb content of more than 0.2% results in coarse precipitates, poor workability, and increased production costs. Thus, if Nb is contained, the Nb content is preferably limited to the range of 0.005% to 0.2%, more preferably 0.005% to 0.15%.

B decreases the lath intervals of bainite and thereby contributes to improved punchability in mass production. These effects preferably require a B content of 0.0002% or more. However, an excessive B content of more than 0.0030% results in poor workability. Thus, if B is contained, the B content is preferably limited to the range of 0.0002% to 0.0030%, more preferably 0.0003% to 0.0020%.

At least one selected from Cu: 0.005% to 0.3%, Ni: 0.005% to 0.3%, and Sn: 0.005% to 0.3%

Cu, Ni, and Sn are elements that contribute to increased strength by solute strengthening. If necessary, one or two or more of Cu, Ni, and Sn may be contained. It is desirable to contain Cu: 0.005% or more, Ni: 0.005% or more, and/or Sn: 0.005% or more to produce the effect. However, a Cu content of more than 0.3%, a Ni content of more than 0.3%, and/or a Sn content of more than 0.3% results in poor hot workability and may result in surface layer cracking during hot rolling. Thus, if Cu, Ni, and/or Sn are contained, each of the Cu content, the Ni content, and the Sn content is preferably limited to the range of 0.005% to 0.3%, more preferably 0.005% to 0.2%.

At Least One Selected from Mo: 0.002% to 0.3% and Cr: 0.002% to 0.3%

Mo and Cr are elements that tend to form carbide (precipitates) and contribute to improved punchability in mass production by the formation of the precipitates. Mo and Cr are also elements that contribute to improved hardenability. Mo and Cr are also elements that contribute to finer bainite lath by decreasing the bainite transformation temperature. One or both of Mo and Cr may be contained, if necessary. It is desirable to contain Mo: 0.002% or more and/or Cr: 0.002% or more to produce these effects. However, an excessive Mo content of more than 0.3% and/or an excessive Cr content of more than 0.3% results in increased production costs and economic disadvantages. Thus, if Mo and/or Cr is contained, each of the Mo content and the Cr content is preferably limited to the range of 0.002% to 0.3%, more preferably 0.002% to 0.2%.

At Least One Selected from Ca: 0.0002% to 0.004% and REM: 0.0002% to 0.004%

Ca and REM are elements that effectively contribute to improved workability by morphology control of inclusions. If necessary, one or both of Ca and REM may be contained. It is desirable to contain Ca: 0.0002% or more and/or REM: 0.0002% or more to produce the effect. However, a Ca content of more than 0.004% and/or a REM content of more than 0.004% results in an increased amount of inclusions in steel and poor workability. Thus, if Ca and/or REM is contained, each of the Ca content and the REM content is preferably limited to the range of 0.0002% to 0.004%, more preferably 0.0002% to 0.003%.

The balance other than the components described above includes Fe and incidental impurities.

The reason for limiting the microstructure of a high-strength hot-rolled steel sheet according to aspects of the present invention will be described below.

A high-strength hot-rolled steel sheet according to the second embodiment has a microstructure in which a bainite phase constitutes more than 92% by volume, the average lath interval of bainite is 0.60 μm or less, and the ratio of Fe-based carbide precipitated in bainite lath grains to all Fe-based carbide is 10% or more by number.

In order to achieve the desired punchability in mass production, it is important that a bainite phase should constitute more than 92%, preferably more than 94%, by volume of the steel sheet structure, as described above. The remainder other than the bainite phase includes one or more of a ferrite phase, a martensite phase, a retained austenite phase, and pearlite. The martensite phase and the retained austenite phase are harder and more brittle than the main phase bainite and impair punchability in mass production. Thus, the martensite phase and the retained austenite phase preferably constitute less than 1% by volume in total. Although retained austenite is not hard, retained austenite becomes martensite by strain-induced transformation during punching. Thus, like martensite, retained austenite adversely affects punchability. The bainite phase is a mixed microstructure of ferrite and Fe-based carbide. In such a microstructure composed mainly of the bainite phase alone, an interface between ferrite and Fe-based carbide acts as a starting point for the formation of micro voids during stamping. Thus, such a microstructure is advantageous to both appropriate formation of micro voids and subsequent void linking.

In accordance with aspects of the present invention, the intervals of bainite lath, which is the lower microstructure of the bainite phase, are 0.60 μm or less. This is based on the findings that the microstructure factor that controls punchability in mass production is not the size of the bainite phase but the lower microstructure bainite lath and that a decrease in lath intervals of bainite is important in improving punchability in mass production. When the lath intervals of bainite are more than 0.60 μm, the desired punchability in mass production cannot be achieved. Thus, the lath intervals of bainite are limited to 0.60 m or less, preferably 0.50 m or less, more preferably 0.45 μm or less.

A hot-rolled steel sheet according to aspects of the present invention has a microstructure that is composed mainly of the bainite phase alone. The bainite phase contains precipitated carbide (Fe-based carbide). The ratio of Fe-based carbide precipitated in bainite lath grains to all precipitated Fe-based carbide is 10% or more by number. Control of carbide (Fe-based carbide) precipitation sites is important in improving punchability in mass production. When the ratio of Fe-based carbide precipitated in bainite lath grains to all precipitated Fe-based carbide is less than 10% by number, the desired good punchability in mass production cannot be achieve. Thus, the ratio of Fe-based carbide precipitated in bainite lath grains to all precipitated Fe-based carbide is limited to 10% or more, preferably 15% or more, more preferably 20% or more, by number.

A preferred method for producing a high-strength hot-rolled steel sheet according to aspects of the present invention will be described below.

In accordance with aspects of the present invention, a steel slab having the composition described above is heated and is subjected to hot rolling composed of rough rolling and finish rolling to form a hot-rolled steel sheet.

A method for producing a steel slab is not particularly limited. Molten steel having the composition described above is formed by a common melting method, for example, in a converter, an electric furnace, or an induction furnace, and, if necessary, is subjected to secondary refining in vacuum degassing equipment, and is formed into a steel slab having predetermined dimensions by a common casting method, such as by continuous casting. An ingot making and blooming method may also be used without problems. The steel slab may be a thin slab having a thickness of approximately 30 mm. In the case of a thin slab, rough rolling may be omitted.

In accordance with aspects of the present invention, an electro-magnetic stirrer (EMS) or intentional bulging soft reduction casting (IBSR) may be used to reduce segregation of steel components during continuous casting. Electro-magnetic stirrer treatment can form equiaxed crystals at half the thickness of a sheet and reduce segregation. Intentional bulging soft reduction casting can prevent the flow of molten steel in an unsolidified portion of a continuous cast slab and reduce segregation at half the thickness of a sheet. At least one of these segregation reduction treatments can be used to achieve good punchability characteristic of aspects of the present invention and improve elongation among the tensile properties described below.

A steel slab having the composition described above is heated to a heating temperature of 1100° C. or more and is subjected to hot rolling.

Steel Slab Heating Temperature: 1100° C. or more

In accordance with aspects of the present invention, precipitates in a slab must be redissolved. Thus, a steel slab is heated to a heating temperature of 1100° C. or more. A heating temperature of less than 1100° C. results in insufficient redissolution of precipitates, and a desired precipitate distribution cannot be achieved in a subsequent process. The heating temperature is preferably 1150° C. or more. An excessively high heating temperature of more than 1300° C. results in coarse crystal grains and consequently coarse bainite lath. Thus, it is desirable that the heating temperature of a steel slab be limited to 1300° C. or less.

A heated steel slab is subjected to hot rolling having rough rolling and finish rolling to form a hot-rolled steel sheet. The rough rolling may be performed under any conditions where a desired sheet bar size can be achieved.

The rough rolling is followed by finish rolling. The conditions for the finish rolling are very important for the formation of a desired bainite lath microstructure.

Total Rolling Reduction of Two Final Passes in Finish Rolling: 30% or more Formation of a desired bainite lath microstructure requires bainite transformation of austenite (γ) having sufficiently accumulated strain. Thus, in accordance with aspects of the present invention, the total rolling reduction of two final passes in finish rolling is limited to 30% or more.

When the total rolling reduction of two final passes in finish rolling is less than 30%, strain is insufficiently accumulated in γ, and a desired bainite lath microstructure cannot be formed after transformation. Thus, the total rolling reduction of two final passes in finish rolling is limited to 30% or more, preferably 40% or more, more preferably 50% or more.

Finish-Rolling Finishing Temperature: ($Ar_3$ Transformation Temperature) to ($A_{r3}$ Transformation Temperature+120° C.)

Finish-rolling finishing temperature control is also important for bainite transformation of austenite (γ) having sufficiently accumulated strain. When the finish-rolling finishing temperature is less than the $A_{r3}$ transformation temperature, it is difficult to form the desired microstructure, that is, the microstructure composed mainly of a bainite phase alone. When the finish-rolling finishing temperature is higher than ($A_{r3}$ transformation temperature+120° C.), it is difficult to form a fine bainite phase. Thus, the finish-rolling finishing temperature is limited to ($A_{r3}$ transformation temperature) to ($A_{r3}$ transformation temperature+120° C.), preferably ($A_{r3}$ transformation temperature) to ($A_{r3}$ transformation temperature+80° C.). The finish-rolling finishing temperature herein refers to a surface temperature. The term "$A_{r3}$ transformation temperature", as used herein, refers to a transformation temperature determined from a changing point in a thermal expansion curve obtained by cooling at a cooling rate of 1° C./s after processing with a Formastor testing machine.

After the finish rolling, cooling is performed. The cooling conditions are also very important for the formation of a desired microstructure.

Cooling Start: Within 2 Seconds after Finish Rolling

In order to form a desired bainite lath microstructure by bainite transformation of γ having sufficiently accumulated strain, cooling must be started within 2 seconds after finish rolling. When cooling is started more than 2 seconds after finish rolling, recovery of γ and recrystallization occur, and the number of nuclei for bainite transformation decreases. Thus, desired lath intervals of bainite cannot be formed. Thus, cooling is started within 2 seconds, preferably 1.5 seconds, more preferably 1 second, after finish rolling.

Average Cooling Rate: 50° C./s or More

When the average cooling rate from the finish-rolling finishing temperature to the cooling stop temperature is less than 50° C./s, pro-eutectoid ferrite is precipitated, and it is difficult to form the microstructure in which a bainite phase constitutes more than 92% by volume and that has the desired lath intervals of bainite. Thus, the average cooling rate of cooling after finish rolling is limited to 50° C./s or more, preferably 60° C./s or more, more preferably 70° C./s or more. The upper limit of the cooling rate depends on the capacity of cooling facilities and is preferably limited to approximately 150° C./s in terms of the shape of steel sheets. In accordance with aspects of the present invention, control of the cooling rate after finish rolling as described above and single-stage cooling to the cooling stop temperature as described below are among the requirements for the formation of the microstructure characteristic of aspects of the present invention.

Cooling Stop Temperature: 300° C. to 500° C.

In accordance with aspects of the present invention, coiling is performed immediately after cooling stop. Thus, the coiling temperature is the same as the cooling stop temperature. When the cooling stop temperature (coiling temperature) is less than 300° C. or more than 500° C., the lath intervals of bainite and the Fe-based carbide distribution cannot be controlled within desired optimum ranges. Thus, the cooling stop temperature (coiling temperature) is limited to the range of 300° C. to 500° C., preferably 350° C. to 500° C., more preferably 400° C. to 500° C.

In accordance with aspects of the present invention, an electro-magnetic stirrer (EMS) or intentional bulging soft reduction casting (IBSR) may be used to reduce segregation of steel components during continuous casting. Electromagnetic stirrer treatment can form equiaxed crystals at half the thickness of a sheet and reduce segregation. Intentional bulging soft reduction casting can prevent the flow of molten steel in an unsolidified portion of a continuous cast slab and reduce segregation at half the thickness of a sheet. At least one of these segregation reduction treatments can be used to achieve good punchability characteristic of aspects of the present invention and improve elongation among the tensile properties described below.

After coiling, scales on the surface may be removed by pickling according to routine procedures. After pickling treatment, a hot-rolled steel sheet may be subjected to temper rolling. After pickling treatment or temper rolling, a hot-rolled steel sheet may be subjected to annealing at a soaking temperature of 730° C. or less and plating treatment in a common hot-dip galvanizing line. The plating treatment may be a treatment for forming a galvanized layer on a surface in a hot-dip galvanizing bath. The galvanized layer may be subjected to alloying treatment to produce a galvannealed steel sheet. When the soaking temperature for annealing treatment is more than 730° C., bainite is tempered, making it difficult to form the microstructure in which a bainite phase constitutes more than 92% by volume and that has the desired lath intervals of bainite. Thus, the soaking temperature for annealing treatment is 730° C. or less. Although the lower limit of the soaking temperature for annealing treatment is not particularly limited, the soaking temperature for annealing treatment is preferably 590° C. or more in terms of adhesion between a hot-dip galvanizing layer and a base steel sheet. After immersed in the hot-dip galvanizing bath, the galvanized layer may be subjected to alloying treatment to produce a galvannealed steel sheet.

The resulting hot-rolled steel sheet may be used to produce a coated steel sheet, such as an electrogalvanized steel sheet, as well as a hot-dip galvanized steel sheet.

A high-strength hot-rolled steel sheet according to aspects of the present invention will be described below with examples.

Example 2

A steel slab having a composition listed in Table 4 was subjected to heating, finish rolling, and cooling after rolling listed in Table 5 to produce a hot-rolled steel sheet. Table 4 also lists the $A_{r3}$ transformation temperature of each steel slab determined from a thermal expansion curve. In continuous casting, hot-rolled steel sheets other than a hot-rolled steel sheet No. 1' of steel A2 in Tables 4 to 6 described below were subjected to an electro-magnetic stirrer (EMS) to reduce segregation of components of the steel. After pickling, some of the hot-rolled steel sheets were passed through a continuous hot-dip galvanizing line and were subjected to annealing treatment under the conditions listed in Table 5 and hot-dip galvanizing treatment to produce hot-dip galvanized steel sheets (GI). In the hot-dip galvanizing treatment, each of the hot-rolled steel sheets subjected to the annealing treatment was immersed in a galvanizing bath (0.1% Al—Zn) at 480° C., and 45 g/m² of a hot-dip galvanized layer was formed on each side of the steel sheet. After the hot-dip galvanizing treatment, some of the hot-rolled steel sheets were subjected to alloying treatment to produce galvannealed steel sheets (GA). The alloying treatment temperature was 520° C.

Test specimens were taken from the hot-rolled steel sheets (including coated steel sheets) and were subjected to microstructure observation, a tensile test, and a punchability-in-mass-production test. The test methods were as follows:

(1) Microstructure Observation

Test specimens for microstructure observation were taken from the hot-rolled steel sheets (coated steel sheets). A vertical cross section (L cross section) of each test specimen parallel to the rolling direction was polished and was etched with a 3% nital solution to expose a microstructure. The microstructure in the L cross section at a quarter thickness in the depth direction was observed with a scanning electron microscope (magnification: 3000 times). Ten visual fields of the microstructure were photographed. Phases other than a bainite phase were separated by image analysis to determine the percentage of the phases other than bainite and calculate the area percentage of the bainite phase. The area percentage calculated in this manner was considered to be the volume percentage of the bainite phase.

Samples for a thin film were taken from the hot-rolled steel sheets (coated steel sheets) at a quarter thickness in the depth direction and were subjected to mechanical polishing and electropolishing to prepare thin film specimens. The microstructure of each thin film specimen was observed with a transmission electron microscope (magnification: approximately 30000). Ten visual fields of the microstructure were photographed. The lath intervals of bainite were measured in the microstructure photographs and were averaged to determine the lath intervals of bainite of each hot-rolled steel sheet.

Test specimens for microstructure observation were taken from the hot-rolled steel sheets (coated steel sheets). A vertical cross section (L cross section) of each test specimen parallel to the rolling direction was polished and was etched with a 3% nital solution to expose a microstructure. A replica sample at a quarter thickness in the depth direction was prepared. The microstructure of the replica sample was observed a transmission electron microscope (magnification: approximately 30000 times). Ten visual fields of the microstructure were photographed. Fe-based carbide was counted in each precipitation site (at a grain boundary and within a grain) in the microstructure photographs, thereby calculating the ratio of the number of Fe precipitates in bainite lath to the number of all Fe precipitates. Fe-based carbide (precipitates) was identified by the shape of the precipitates and by EDX analysis.

It was confirmed that substantially the same microstructure was also observed in a central portion in the thickness direction.

(2) Tensile Test

Three JIS No. 5 tensile test pieces were taken from each of the hot-rolled steel sheets (coated steel sheets) such that the tensile direction was perpendicular to the rolling direction. The test pieces were subjected to a tensile test according to JIS Z 2241. The cross head speed was 10 mm/min. The averages of tensile properties (tensile strength TS and elongation El) were considered to be the tensile properties of the steel sheets.

(3) Punchability-in-Mass-Production Test

A blank sheet (size: 150×150 mm) was taken from each of the hot-rolled steel sheets (coated steel sheets). A 50-mmφ punching punch of a flat-bottomed type was used. The hole diameter of a die was determined such that the punching clearance was 30%. A spacer was placed on the punching die. A blank sheet was placed on the spacer and was held with a blank holder. A hole was then punched in the blank sheet. After punching, the fracture surface condition of the punched surface was observed around the entire perimeter of the punched hole with a scanning electron microscope (magnification: 100 times) and was checked for cracking, chipping, a brittle fracture surface, a secondary shear surface, and cross section roughness. Punchability in mass production was rated as follows: fracture surfaces free of cracking, chipping, a brittle fracture surface, a secondary shear surface, and cross section roughness were rated as good (circle); fracture surfaces having cross section roughness were rated as fair (triangle); and the other fracture surfaces were rated as poor (x).

Table 6 shows the results.

TABLE 4

| Steel No. | Chemical composition (mass %) | | | | | | | | | | | Transformation temperature $A_{r3}$ (° C.) | Remarks |
| --- | --- | --- | --- | --- | --- | --- | --- | --- | --- | --- | --- | --- | --- |
| | C | Si | Mn | P | S | Al | N | Ti | Nb, B | Cu, Ni, Sn | Mo, Cr | Ca, REM | | |
| A2 | 0.059 | 0.15 | 1.71 | 0.047 | 0.0034 | 0.044 | 0.0034 | 0.095 | Nb: 0.01 | — | — | Ca: 0.0011 | 879 | Suitable example |
| B2 | 0.071 | 0.76 | 1.93 | 0.023 | 0.0004 | 0.015 | 0.0042 | 0.088 | B: 0.0012 | — | — | REM: 0.0005 | 878 | Suitable example |
| C2 | 0.076 | 1.39 | 1.95 | 0.007 | 0.0014 | 0.038 | 0.0021 | 0.059 | Nb: 0.006 | Sn: 0.05 | — | — | 893 | Suitable example |
| D2 | 0.081 | 0.73 | 1.34 | 0.011 | 0.0005 | 0.033 | 0.0033 | 0.099 | — | — | — | — | 882 | Suitable example |
| E2 | 0.092 | 0.61 | 1.48 | 0.013 | 0.0009 | 0.039 | 0.0027 | 0.104 | — | — | — | — | 870 | Suitable example |
| F2 | 0.097 | 0.09 | 1.27 | 0.029 | 0.0027 | 0.024 | 0.0062 | 0.064 | — | Ni: 0.18 | Cr: 0.08, Mo: 0.04 | — | 863 | Suitable example |
| G2 | 0.104 | 0.92 | 1.11 | 0.005 | 0.0004 | 0.066 | 0.0011 | 0.124 | B: 0.0004 | — | Cr: 0.03 | — | 886 | Suitable example |
| H2 | 0.113 | 0.27 | 1.67 | 0.011 | 0.0009 | 0.042 | 0.0048 | 0.097 | — | — | Mo: 0.08 | — | 841 | Suitable example |
| I2 | 0.124 | 0.19 | 1.83 | 0.019 | 0.0011 | 0.033 | 0.0037 | 0.155 | Nb: 0.013 | — | — | — | 835 | Suitable example |
| J2 | 0.141 | 0.04 | 1.89 | 0.009 | 0.0038 | 0.041 | 0.0024 | 0.191 | — | Cu: 0.03, Ni: 0.09 | — | — | 815 | Suitable example |
| K2 | 0.061 | 1.15 | 1.99 | 0.012 | 0.0027 | 0.055 | 0.0039 | 0.081 | — | Cu: 0.008, Ni: 0.015 | — | — | 890 | Suitable example |
| L2 | 0.071 | 0.64 | 1.39 | 0.009 | 0.0005 | 0.029 | 0.0032 | 0.109 | — | — | — | — | 879 | Suitable example |
| M2 | 0.073 | 0.08 | 0.94 | 0.013 | 0.0011 | 0.049 | 0.0048 | 0.077 | — | — | — | — | 869 | Comparative example |
| N2 | 0.104 | 0.03 | 1.91 | 0.011 | 0.0028 | 0.058 | 0.0053 | 0.044 | — | — | — | — | 826 | Comparative example |
| O2 | 0.044 | 0.56 | 1.26 | 0.022 | 0.0017 | 0.047 | 0.0046 | 0.058 | V: 0.007, Nb: 0.009 | — | — | — | 898 | Comparative example |

TABLE 5

| Hot-rolled steel sheet No. | Steel No. | Sheet thickness mm | Hot-rolling conditions Heating temperature (° C.) | Hot-rolling conditions Finish-rolling finishing temperature (° C.) | Hot-rolling conditions Total rolling reduction of two final passes (%) | Cooling conditions Cooling start time (s) | Cooling conditions Average cooling rate* (° C./s) | Coiling conditions Coiling temperature (° C.) | Hot-dip galvanizing treatment Annealing temperature (° C.) | Hot-dip galvanizing treatment Alloying treatment | Remarks |
|---|---|---|---|---|---|---|---|---|---|---|---|
| 1 | A2 | 2.9 | 1180 | 915 | 40 | 1.3 | 70 | 435 | — | — | Example |
| 1' | A2 | 2.9 | 1180 | 910 | 40 | 1.2 | 70 | 440 | — | — | Example |
| 2 | B2 | 2.6 | 1250 | 950 | 30 | 0.9 | 80 | 475 | — | — | Example |
| 3 | B2 | 2.0 | 1250 | 920 | 40 | 0.7 | 90 | 450 | 600 | — | Example |
| 4 | B2 | 2.6 | 1250 | 920 | 40 | 1.4 | 80 | 490 | 775 | — | Comparative example |
| 5 | B2 | 2.6 | 1250 | 910 | 45 | 2.7 | 55 | 395 | — | — | Comparative example |
| 6 | C2 | 4.0 | 1200 | 900 | 40 | 1.4 | 65 | 440 | — | — | Example |
| 7 | D2 | 2.6 | 1240 | 925 | 55 | 0.7 | 100 | 410 | — | — | Example |
| 8 | D2 | 2.0 | 1240 | 840 | 40 | 1.4 | 125 | 430 | — | — | Comparative example |
| 9 | D2 | 2.6 | 1240 | 880 | 20 | 1.7 | 95 | 495 | — | — | Comparative example |
| 10 | E2 | 3.6 | 1260 | 905 | 60 | 0.5 | 95 | 425 | 690 | Yes | Example |
| 11 | E2 | 3.6 | 1260 | 910 | 45 | 1.3 | 25 | 450 | 635 | — | Comparative example |
| 12 | E2 | 2.6 | 1260 | 930 | 40 | 1.9 | 80 | 280 | — | — | Comparative example |
| 13 | F2 | 3.6 | 1250 | 875 | 30 | 1.9 | 50 | 495 | — | — | Example |
| 14 | G2 | 2.0 | 1200 | 940 | 40 | 1.3 | 145 | 410 | — | — | Example |
| 15 | H2 | 4.0 | 1260 | 860 | 35 | 0.7 | 55 | 365 | — | — | Example |
| 16 | I2 | 2.6 | 1280 | 920 | 35 | 1.6 | 125 | 345 | — | — | Example |
| 17 | J2 | 2.0 | 1290 | 905 | 50 | 1.1 | 75 | 415 | 725 | — | Example |
| 18 | K2 | 3.6 | 1260 | 895 | 25 | 1.7 | 85 | 460 | — | — | Comparative example |
| 19 | L2 | 3.6 | 1275 | 900 | 20 | 2.8 | 105 | 430 | — | — | Comparative example |
| 20 | M2 | 3.6 | 1250 | 900 | 40 | 1.5 | 55 | 495 | — | — | Comparative example |
| 21 | N2 | 3.6 | 1280 | 885 | 55 | 1.7 | 50 | 465 | — | — | Comparative example |
| 22 | O2 | 3.6 | 1240 | 950 | 35 | 1.4 | 60 | 440 | 720 | — | Comparative example |

*Average cooling rate from finish-rolling finishing temperature to coiling temperature

TABLE 6

| Hot-rolled steel sheet No. | Steel No. | Structure** Bainite fraction (vol %) | Structure** Lath interval of bainite (µm) | Structure** Ratio of Fe-based carbide in grains* (%) | Tensile properties Tensile strength TS (MPa) | Tensile properties Elongation El (%) | Punchability in mass production Evaluation of punched surface | Remarks |
|---|---|---|---|---|---|---|---|---|
| 1 | A2 | 93 | 0.49 | 11.1 | 710 | 26 | ○ | Example |
| 1' | A2 | 91 | 0.50 | 11.4 | 712 | 24 | Δ | Example |
| 2 | B2 | 93 | 0.43 | 15.9 | 733 | 25 | ○ | Example |
| 3 | B2 | 93 | 0.40 | 12.3 | 741 | 24 | ○ | Example |
| 4 | B2 | 72 | 1.41 | 11.4 | 750 | 15 | x | Comparative example |
| 5 | B2 | 93 | 1.03 | 9.0 | 744 | 14 | x | Comparative example |
| 6 | C2 | 94 | 0.45 | 15.0 | 758 | 26 | ○ | Example |
| 7 | D2 | 97 | 0.39 | 15.5 | 808 | 24 | ○ | Example |
| 8 | D2 | 63 | 0.80 | 7.3 | 798 | 14 | x | Comparative example |
| 9 | D2 | 82 | 1.08 | 6.1 | 795 | 13 | x | Comparative example |
| 10 | E2 | 98 | 0.34 | 15.3 | 813 | 26 | ○ | Example |
| 11 | E2 | 68 | 0.70 | 12.8 | 809 | 14 | x | Comparative example |
| 12 | E2 | 81 | 0.41 | 3.1 | 801 | 13 | x | Comparative example |
| 13 | F2 | 93 | 0.58 | 20.5 | 797 | 21 | ○ | Example |
| 14 | G2 | 93 | 0.36 | 16.7 | 826 | 20 | ○ | Example |
| 15 | H2 | 96 | 0.33 | 15.2 | 853 | 20 | ○ | Example |
| 16 | I2 | 97 | 0.29 | 10.2 | 889 | 19 | ○ | Example |
| 17 | J2 | 93 | 0.44 | 15.1 | 894 | 19 | ○ | Example |

TABLE 6-continued

| Hot-rolled steel sheet No. | Steel No. | Structure** Bainite fraction (vol %) | Structure** Lath interval of bainite (μm) | Structure** Ratio of Fe-based carbide in grains* (%) | Tensile properties Tensile strength TS (MPa) | Tensile properties Elongation El (%) | Punchability in mass production Evaluation of punched surface | Remarks |
|---|---|---|---|---|---|---|---|---|
| 18 | K2 | 82 | 0.78 | 8.5 | 768 | 15 | x | Comparative example |
| 19 | L2 | 90 | 0.69 | 9.1 | 771 | 14 | x | Comparative example |
| 20 | M2 | 66 | 0.93 | 4.4 | 678 | 13 | x | Comparative example |
| 21 | N2 | 78 | 0.88 | 5.8 | 689 | 12 | x | Comparative example |
| 22 | O2 | 63 | 1.27 | 3.9 | 671 | 11 | x | Comparative example |

*Number ratio of Fe-based carbide in grains to all Fe-based carbide
**Measurement at quarter thickness The hot-rolled steel sheets (coated steel sheets) according to the examples had a high tensile strength TS of 700 MPa or more and good punchability in mass production. In contrast, the comparative examples outside the scope of the present invention had poor punchability in mass production.

The invention claimed is:

1. A hot-rolled steel sheet having a composition containing, on a mass percent basis,
C: 0.05% to 0.15%, Si: 1.5% or less,
Mn: 1.0% to 2.0%, P: 0.05% or less,
S: 0.005% or less, Al: 0.1% or less,
N: 0.01% or less, Ti: 0.05% to 0.2%, and
the balance being Fe and incidental impurities,
wherein the hot-rolled steel sheet has a microstructure comprising a bainite of more than 92% and 97% or less by volume, the bainite having an average lath interval of 0.60 or less, and a ratio of Fe-based carbide precipitated in bainite lath grains to all Fe-based carbide is 10% or more by number, and
wherein the hot-rolled steel sheet ha ensile strength of 700 MPa or more and 758 MPa or less.

2. The hot-rolled steel sheet according to claim 1, wherein the composition further contains at least one selected from Nb: 0.005% to 0.2% and B: 0.0002% to 0.0030% on a mass percent basis.

3. The hot-rolled steel sheet according to claim 1, wherein the composition further contains at least one selected from Cu: 0.005% to 0.3%, Ni: 0.005% to 0.3%, and Sn: 0.005% to 0.3% on a mass percent basis.

4. The hot-rolled steel sheet according to claim 2, wherein the composition further contains at least one selected from Cu: 0.005% to 0.3%, Ni: 0.005% to 0.3%, and Sn: 0.005% to 0.3% on a mass percent basis.

5. The hot-rolled steel sheet according to claim 1, wherein the composition further contains at least one selected from Mo: 0.002% to 0.3% and Cr: 0.002% to 0.3% on a mass percent basis.

6. The hot-rolled steel sheet according to claim 2, wherein the composition further contains at least one selected from Mo; 0.002% to 0.3% and Cr: 0.002% to 0.3% on a mass percent basis.

7. The hot-rolled steel sheet according to claim 3, wherein the composition further contains at least one selected from Mo: 0.002% to 0.3% and Cr: 0.002% to 0.3% on a mass percent basis.

8. The hot-rolled steel sheet according to claim 4, wherein the composition further contains at least one selected from Mo: 0.002% to 0.3% and Cr: 0.002% to 0.3% on a mass percent basis.

9. The hot-rolled steel sheet according to claim 1, wherein the composition further contains at least one selected from Ca: 0.0002% to 0.004% and REM: 0.0002% to 0.004% on a mass percent basis.

10. The hot-rolled steel sheet according to claim 2, wherein the composition further contains at least one selected from Ca: 0.0002% to 0.004% and REM: 0.0002% to 0.004% on a mass percent basis.

11. The hot-rolled steel sheet according to claim 3, wherein the composition further contains at least one selected from Ca: 0.0002% to 0.004% and REM: 0.0002% to 0.004% on a mass percent basis.

12. The hot-rolled steel sheet according to claim 4, wherein the composition further contains at least one selected from Ca: 0.0002% to 0.004% and REM: 0.0002% to 0.004% on a mass percent basis.

13. The hot-rolled, steel sheet according to claim 5, wherein the composition further contains at least one selected from Ca: 0.0002% to 0.004% and REM: 0.0002% to 0.004% on a mass percent basis.

14. The hot-rolled, steel sheet according to claim 6, wherein the composition further contains at least one selected from Ca: 0.0002% to 0.004% and REM: 0.0002% to 0.004% on a mass percent basis.

15. The hot-rolled, steel sheet according to claim 7, wherein the composition further contains at least one selected from Ca: 0.0002% to 0.004% and REM: 0.0002% to 0.004% on a mass percent basis.

16. The hot-rolled steel sheet according to claim 8, wherein the composition further contains at least one selected from Ca: 0.0002% to 0.004% and REM: 0.0002% to 0.004% on a mass percent basis.

17. A hot-dip galvanized steel sheet, having a hot-dip galvanizing layer or alloyed hot-dip galvanizing layer on a surface of the hot-rolled steel sheet according to claim 1.

* * * * *